(12) United States Patent
Faulkner (10) Patent No.: US 7,436,935 B2
(45) Date of Patent: *Oct. 14, 2008

(54) QUALIFYING TELEPHONE LINES FOR DATA TRANSMISSION

(75) Inventor: Roger Faulkner, Swindon (GB)

(73) Assignee: Tollgrade Communications, Inc., Wilmington, DE (US)

( * ) Notice: Subject to any disclaimer, the term of this patent is extended or adjusted under 35 U.S.C. 154(b) by 577 days.

This patent is subject to a terminal disclaimer.

(21) Appl. No.: 11/007,970

(22) Filed: Dec. 9, 2004

(65) Prior Publication Data

US 2005/0135567 A1    Jun. 23, 2005

Related U.S. Application Data

(62) Division of application No. 10/019,589, filed as application No. PCT/GB00/02492 on Jun. 23, 2000, now Pat. No. 7,012,991.

(30) Foreign Application Priority Data

Jun. 23, 1999    (GB)    .................................. 9914702.7

(51) Int. Cl.
*H04M 1/24* (2006.01)
*H04M 3/08* (2006.01)
*H04M 3/22* (2006.01)

(52) U.S. Cl. ...................... 379/1.04; 379/22.02; 379/24; 379/30

(58) Field of Classification Search ................ 379/1.01, 379/1.03, 1.04, 22, 22.01, 22.02, 22.03, 22.07, 379/22.08, 23, 24, 30, 27.01, 27.03, 27.06, 379/28, 29.01, 29.03, 29.04, 29.09; 324/500, 324/522, 523, 525, 527, 533, 534; 714/25

See application file for complete search history.

(56) References Cited

U.S. PATENT DOCUMENTS

| 3,882,287 | A | 5/1975 | Simmonds |
| 4,087,657 | A | 5/1978 | Peoples |
| 4,186,283 | A | 1/1980 | Simmonds |
| 4,529,847 | A | 7/1985 | DeBalko |
| 4,620,069 | A | 10/1986 | Godwin et al. |
| 4,868,506 | A | 9/1989 | DiStefano et al. |
| 5,025,221 | A | 6/1991 | Blaess |
| 5,083,086 | A | 1/1992 | Steiner |
| 5,121,420 | A | 6/1992 | Marr et al. |

(Continued)

FOREIGN PATENT DOCUMENTS

EP    0722164 A1    7/1996

(Continued)

OTHER PUBLICATIONS

"Loop Qualification, Prerequisite for Volume xDSL Deployment," The TeleChoice Report on xDSL, vol. 2, No. 3, Mar. 1997.

(Continued)

*Primary Examiner*—Quoc D Tran
(74) *Attorney, Agent, or Firm*—The Webb Law Firm (57) ABSTRACT

A system for qualifying subscriber lines in a telephony system for high speed data services. The system includes a measurement unit that makes one ended electrical measurements on the subscriber lines. Measurements on the subscriber lines are used to predict which of the lines can carry signals used in high speed data services. The predictions are used in marketing select data transmission services.

20 Claims, 6 Drawing Sheets

U.S. PATENT DOCUMENTS

| | | | |
|---|---|---|---|
| 5,128,619 | A | 7/1992 | Bjork et al. |
| 5,157,336 | A | 10/1992 | Crick |
| 5,270,661 | A | 12/1993 | Burnett |
| 5,302,905 | A | 4/1994 | Crick |
| 5,319,311 | A | 6/1994 | Kawashima et al. |
| 5,400,321 | A | 3/1995 | Nagato |
| 5,402,073 | A | 3/1995 | Ross |
| 5,404,388 | A | 4/1995 | Eu |
| 5,436,953 | A | 7/1995 | Nilson |
| 5,461,318 | A | 10/1995 | Borchert et al. |
| 5,465,287 | A | 11/1995 | Egozi |
| 5,528,661 | A | 6/1996 | Siu et al. |
| 5,528,679 | A | 6/1996 | Taarud |
| 5,606,592 | A | 2/1997 | Galloway et al. |
| 5,629,628 | A | 5/1997 | Hinds et al. |
| 5,636,202 | A | 6/1997 | Garney |
| 5,680,391 | A | 10/1997 | Barron et al. |
| 5,699,402 | A | 12/1997 | Bauer et al. |
| 5,758,027 | A | 5/1998 | Meyers et al. |
| 5,790,523 | A | 8/1998 | Ritchie, Jr. et al. |
| 5,870,451 | A | 2/1999 | Winkler et al. |
| 5,937,033 | A | 8/1999 | Bellows |
| 5,956,386 | A | 9/1999 | Miller |
| 5,978,449 | A | 11/1999 | Needle |
| 6,002,671 | A | 12/1999 | Kahkoska et al. |
| 6,014,425 | A | 1/2000 | Bingel et al. |
| 6,026,145 | A | 2/2000 | Bauer et al. |
| 6,091,338 | A | 7/2000 | Natra |
| 6,107,867 | A | 8/2000 | Lakshmikumar |
| 6,111,861 | A | 8/2000 | Burgess |
| 6,115,466 | A | 9/2000 | Bella |
| 6,118,860 | A | 9/2000 | Hillson et al. |
| 6,154,447 | A | 11/2000 | Vedder |
| 6,169,785 | B1 | 1/2001 | Okazaki |
| 6,177,801 | B1 | 1/2001 | Chong et al. |
| 6,181,775 | B1 | 1/2001 | Bella |
| 6,192,109 | B1 | 2/2001 | Amrany et al. |
| 6,205,202 | B1 | 3/2001 | Yoshida et al. |
| 6,209,108 | B1 | 3/2001 | Pett et al. |
| 6,215,854 | B1 | 4/2001 | Walance |
| 6,215,855 | B1 | 4/2001 | Schneider |
| 6,226,356 | B1 | 5/2001 | Brown |
| 6,240,177 | B1 | 5/2001 | Guntzburger et al. |
| 6,256,377 | B1 | 7/2001 | Murphree et al. |
| 6,263,047 | B1 | 7/2001 | Randle et al. |
| 6,263,048 | B1 | 7/2001 | Nelson et al. |
| 6,266,395 | B1 | 7/2001 | Liu et al. |
| 6,285,653 | B1 | 9/2001 | Koeman et al. |
| 6,292,468 | B1 | 9/2001 | Sanderson |
| 6,292,539 | B1 | 9/2001 | Eichen et al. |
| 6,349,130 | B1 | 2/2002 | Posthuma et al. |
| 6,366,644 | B1 | 4/2002 | Sisk et al. |
| 6,445,733 | B1 | 9/2002 | Zuranski et al. |
| 6,456,694 | B1 | 9/2002 | Posthuma |
| 6,463,126 | B1 | 10/2002 | Manica et al. |
| 6,466,647 | B1 | 10/2002 | Tennyson |
| 6,487,276 | B1 | 11/2002 | Rosen et al. |
| 6,507,870 | B1 | 1/2003 | Yokell et al. |
| 6,614,880 | B1 | 9/2003 | Lysaght et al. |
| 6,687,336 | B1 | 2/2004 | Holeva |
| 6,781,386 | B2 | 8/2004 | Le Henaff |
| 6,895,081 | B1* | 5/2005 | Schmidt et al. ............ 379/1.01 |
| 7,012,991 | B1* | 3/2006 | Faulkner .................... 379/1.04 |
| 7,263,174 | B2* | 8/2007 | Schmidt et al. ............ 379/1.04 |
| 2002/0089999 | A1 | 7/2002 | Binde |
| 2003/0048756 | A1 | 3/2003 | Chang et al. |

FOREIGN PATENT DOCUMENTS

| | | |
|---|---|---|
| WO | WO 91/11872 | 8/1991 |
| WO | WO 98/44428 A1 | 10/1998 |
| WO | WO 99/63427 A1 | 12/1999 |
| WO | WO 00/27134 | 5/2000 |
| WO | WO 00/64132 | 10/2000 |
| WO | WO 01/01597 A1 | 1/2001 |
| WO | WO 01/24490 | 4/2001 |
| WO | WO 01/67729 | 9/2001 |
| WO | WO 01/67729 A1 | 9/2001 |

OTHER PUBLICATIONS

Goralski, "xDSL Loop Qualification and Testing," IEEE Communications Magazine, May 1999.

Harris Communications, National Communications forum Presentation, Chicago, IL Oct. 5, 1998.

Roehrkasten, "Meassung Von SDSL=Parametern", Nachrichtentechnik Electronik, DE Veb Verlag Technik. Berlin, vol. 48, No. 2, Mar. 1, 1998, pp. 20-21.

Stewart, "Testing ADSL: The Easier, The Better," America's Netwirk, Dec. 15, 1998.

Turnstone Systems, Inc., Product Literature and Presentation at Turnstone Systems, Inc., Sep. 1992.

Woloszynski, "It's Here," Bellcore Exchange Magazine, Jun. 1998.

Stewart, "Testing ADSL: The Easier the Better, America's Network," Dec. 15, 1998 pp. 24-27.

Hedlund, et al., DSL Loop Test Telephony, vol. 235, No. 8, Aug. 24, 1998.

Boets, et al. "The Modelling Aspect of Transmission Line Networks," May 12, 1992, pp. 137-141.

Chiu et al. "Loop Survey in the Taiwan Area and Feasibility Study for HDSL," IEEE, vol. 9, No. 6, Aug. 1991, pp. 801-809.

Rye Senjen et al, "Hybrid Expert Systems for Monitoring and for Diganosis", proceedings of the Conference on Artificial Intelligence for Applications, IEEE, Comp. Soc. Press. Vol, Conf. 9, Mar. 1, 1993, pp. 235-241.

* cited by examiner

| Segment 1 | Segment 2 | Measure +formula | Reference values |
|---|---|---|---|
| 2km .6Cu |  | 12 .39dB | 12 .4dB |
| 2km .6Cu | 2km .6Cu | 24 .17dB | 12 .8dB |
| 2km .6Cu | 2km .5Cu | 25 .59dB | 27 .4dB |
| 2km .5Cu |  | 14 .26dB | 15dB |
| 2km .5Cu | 2km .5Cu | 29 .13dB | 30dB |
| 2km .6Cu | 500m .5Cu | 16 .74dB | 15 .65dB |
| 500m .5Cu | 2km .6Cu | 15 .92dB | 15 .65dB |
| 500m .5Cu | 4km .6Cu | 27 .04dB | 28 .05dB |
| 500m .5Cu | 6km .6Cu | 40 .30dB | 40 .45dB |

QUALIFYING TELEPHONE LINES FOR DATA TRANSMISSION

This application claims the benefit under 35 U.S.C. §120 of U.S. application Ser. No. 10/019,589, entitled "QUALIFYING TELEPHONE LINES FOR DATA TRANSMISSION," filed on Dec. 20, 2001, now U.S. Pat. No. 7,012,991 which is a 371 of PCT/GB00/02492, filed Jun. 23, 2000 and claims priority to United Kingdom Application 9914702.7, filed Jun. 23, 1999, which is herein incorporated by reference in its entirety.

BACKGROUND OF THE INVENTION

This invention relates generally to telephone lines, and more particularly, to qualifying telephone lines for data communications.

Public switched telephone networks, e.g., plain old telephone systems (POTS), were originally designed for voice communications having a limited frequency range. Today, the same POTS networks often carry data transmissions using higher frequencies. The difference in frequencies suggests that some POTS lines, which function well for voice, will function poorly for data. The risk of poor quality data transmissions has motivated telephone operating companies (TELCO's) to develop tests for predicting the quality of lines for data transmissions.

One quality test uses physical line length to determine a line's attenuation. The attenuation of a line whose length is less than about four kilometers (km) is usually low enough for data transmission. But, measuring the line length is typically more involved than measuring the straight line distance between a customer's address and a switching station. Typically, lines form branching structures rather than going radially from the switching station to the customer addresses. Thus, determining a line length usually entails manually mapping the actual branching structures connecting the customer to the switching station. Such complex manual techniques can be time intensive and may lead to errors.

Furthermore, determining that a line's length is less than a preselected limit, e.g., four km, may be insufficient to qualify the line for data transmission. The line's attenuation also depends on the physical properties of each branch segment making up the line, e.g., the gauge mixture of the line. In lines having segments with different properties, the above-described mapping technique generally should take into account the properties of each segment to determine the total attenuation of the line.

TELCO's have also used direct electrical tests to determine the quality of POTS lines for data transmissions. Typically, such tests are manual and two-ended. Two-ended tests involve sending one employee to a customer's address or final distribution point and another employee to a switching station. The two employees coordinate their activities to perform direct electrical measurements on the customer line using hand-held devices. These two-ended measurements are substantially independent of the termination characteristics at the customer's address.

Nevertheless, these two-ended tests need two separate employees, which makes them labor intensive. The labor requirements affect the cost of such tests. The two-ended tests cost about $150 per customer line. This cost is so high that a TELCO is often prohibited from using such tests for all customer lines.

The present invention is directed to overcoming, or at least reducing, one or more of the problems set forth above.

SUMMARY OF THE INVENTION

In one aspect, the invention provides a method of marketing customer telephone lines for selected data transmission services. Each line has associated tip and ring wires. The method includes automatically performing single-ended electrical measurements on the customer telephone lines and determining which of the customer lines qualify for a selected data transmission service from the measurements. The tip and ring wires are driven in a common mode configuration during at least a portion of the measurements upon the associated lines. The method includes sorting the lines by distribution point and qualification to transmit data. The method also includes offering the selected data service to a portion of the customers in response to lines determined to be qualified for the service being available.

A method of marketing data transmission services to customers over telephone lines connected to a switch having a test access, comprising: connecting a measurement unit to the test access; making single-ended electrical measurements at a first frequency on a telephone line connected to the switch; determining whether the telephone line is qualified to provide a selected data service based at least in part on a prediction of attenuation at a second frequency, higher than the first frequency, made from the single-ended measurements; and providing the selected data services to a customer over the telephone line in response to determining that the telephone line is qualified.

A method of marketing data transmission services to customers over telephone lines having associated tip and ring wires, comprising: performing single-ended electrical tests on a plurality of telephone lines connected to a final distribution near where a customer is located, the tests driving tip and ring wires of the lines under test in a common mode configuration; determining whether the tested lines qualify for a selected data service; and offering the data service to the customer over one of the tested lines in response to the one of the tested lines being qualified.

BRIEF DESCRIPTION OF THE DRAWINGS

Other objects, features, and advantages of the invention will be apparent from the following description, taken together with the drawings in which.

DESCRIPTION OF THE PREFERRED EMBODIMENTS

Figure 1:
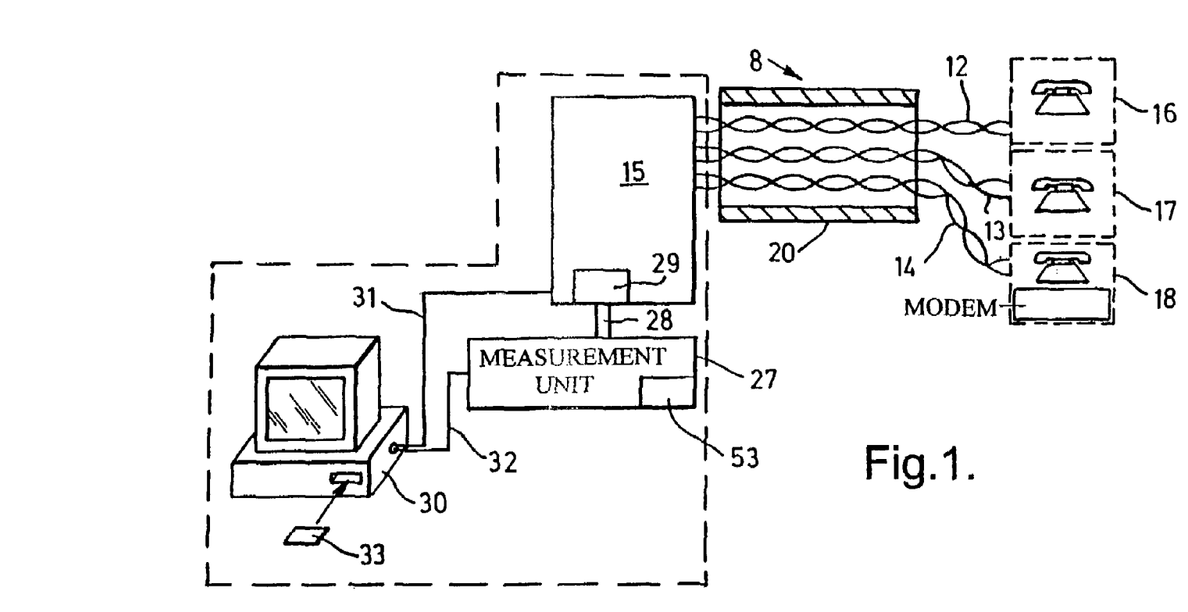
FIG. 1 shows an embodiment of a system for testing the suitability of customer lines for data transmission.

FIG. 1 shows a portion of a POTS network 8. The network 8 includes customer lines 12-14 connecting customer units 16-18, i.e., telephones and/or modems, to a telephony switch 15 located in a TELCO central office 10. The switch 15 may be a POTS switch or any other device for connecting the lines 12-14 to the telephone network 8, e.g., a digital subscriber loop access multiplexer (DSLAM) (not shown).

Each customer line 12-14 is a twisted copper two-wire pair adapted for telephone voice communications. The two wires of each line 12-14 are generally referred to as the ring and tip wires. The lines 12-14 are contained in one or in a series of standard telephony cables 20. The cable 20 may carry more than a dozen customer lines (not all shown) thereby creating an environment that changes electrical and transmission properties of the separate lines 12-14. The properties of the lines 12-14 may also depend on their segment structure.

Figure 2:
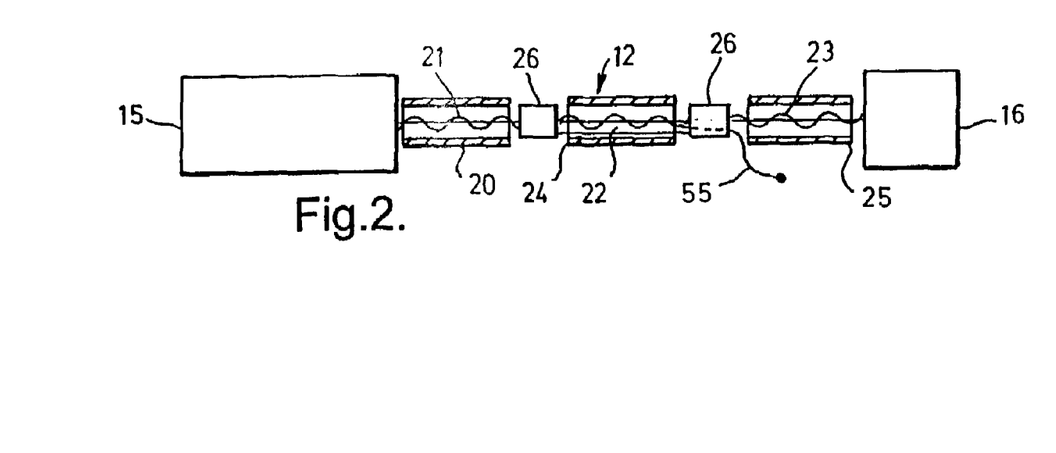
FIG. 2 shows the segments of one customer line from FIG. 1.

FIG. 2 shows that the customer line 12 has several paired copper two-wire segments 21-23. The segments 21-23 are located in separate cables 20, 24-25 and couple serially through couplers 26. Each segment 21-23 may have a different length and/or gauge than the other segments 21-23. The segmented structure of the line 12 can affect electrical properties, e.g., the signal attenuation.

Referring again to FIG. 1, single-ended measurements on the lines 12-14 are performed with a measurement unit 27 located in the central office 10. The measurement unit 27 couples, via a line 28, to a standard voice test access 29 of the switch 15. The test access 29 provides electrical couplings to selected customer lines 12-14 in a voice frequency range of at least between 300 Hertz (Hz) and 4 kilo-Hz (KHz), i.e., a low frequency range. The measurement unit 27 uses the test access 29 to perform a single-ended measurements on the lines 12-14, e.g., impedance measurements.

The line-testing is controlled by a computer 30. The computer 30 sends signals the switch 15, via line 31, e.g., to select the line 12-14 to be tested. The computer 30 sends signals to the measurement unit 27, via line 32, to select and control the test to be performed. The measurement unit 27 sends measurement results to the computer 30 via the same line 32.

The computer 30 includes a storage medium 33 encoding an executable software program for testing selected ones of the lines 12-14. The program includes instructions for one or more methods of controlling single-ended measurements on the lines 12-14. The program also includes instructions for methods of analyzing the measurements to qualify or disqualify the lines 12-14 for data transmissions. Both types of method are described below.

The line testing qualifies or disqualifies the individual lines 12-14 being tested. To qualify, the computer 30 must predict that the line 12-14, under test, will support data transmissions without remedial measures. To disqualify, the computer 30 must predict that the line 12-14, under test, will not support data transmissions without remedial measures. The computer 30 may perform tests before or after the line 12-14, under test, is in service for data transmissions.

Tests to qualify or disqualify a line 12-14 for data transmission involve several steps. For each step, the computer 30 signals the switch 15 to disconnect the particular line 12-14, selected for testing, from the line card (not shown) and reroute the line to the test access 29. When the switch 15 reroutes the line, the computer 30 signals the measurement unit 27 to perform preselected single-ended measurements on the selected line 12-14. The measurement unit 27 performs the measurements and returns results to the computer 30. After receiving the results of the measurements, the computer 30 signals the switch 15 to reroute the selected line 12-14 to the line card. Then, the switch 15 transfers connections for the selected line 12-14 to the line card enabling the associated customer unit 16-18 to again communicate with the rest of the network 8.

Figure 3:
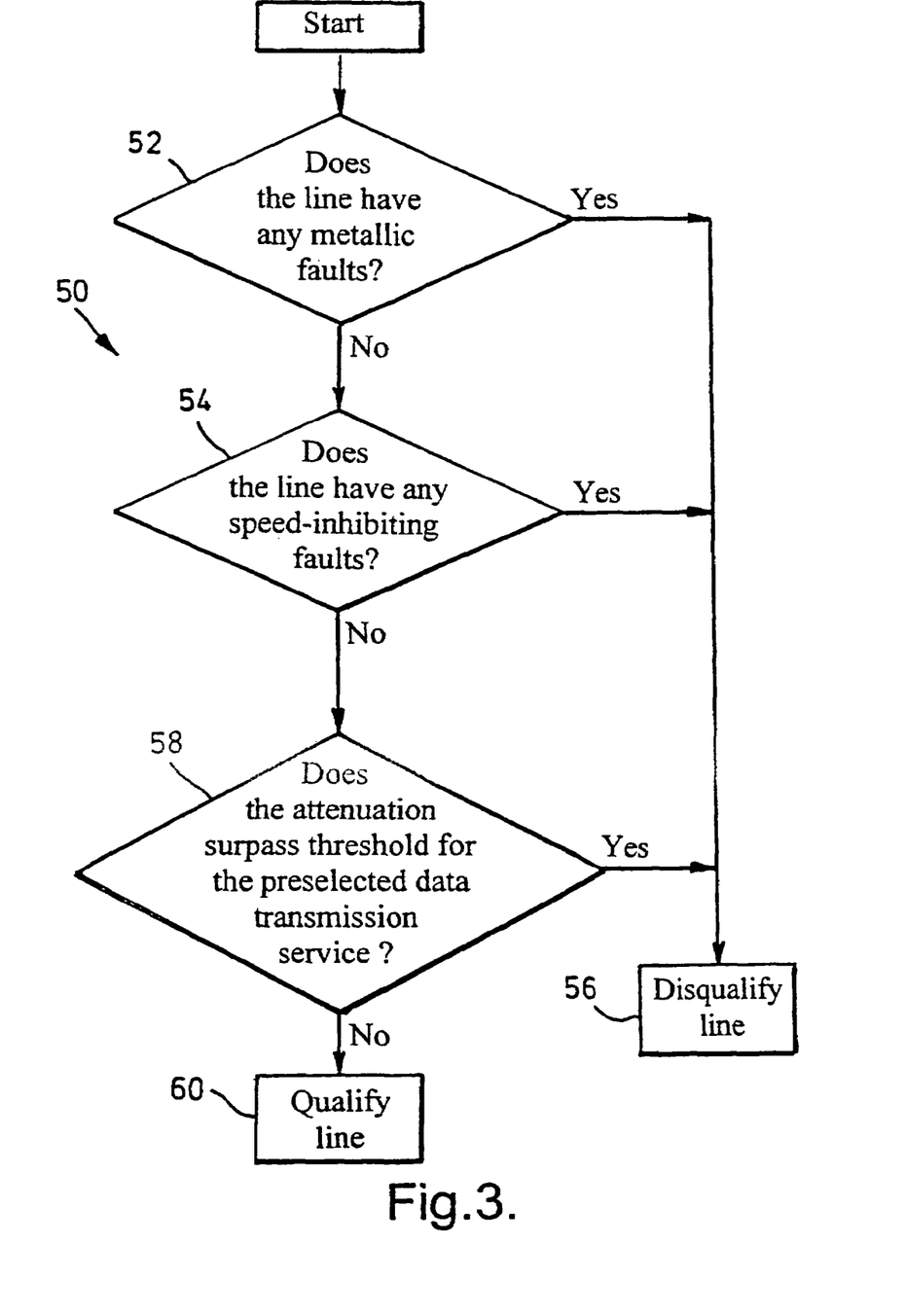
FIG. 3 is a flow chart illustrating a method of testing telephone lines for data transmission.

FIG. 3 is a flow chart illustrating a method 50 for determining the suitability of a selected one of the customer lines 12-14 for a preselected data transmission service. By way of example, the line 12 of FIG. 1 is selected, but any of the lines 12-14 can be evaluated by the method 50. Each step of the method 50 includes one or more single-ended measurements on the selected line 12 and an analysis of the measurements by the computer 30 as has been already described. In addition, the steps of the method 50 fall into two stages.

In the first stage, the computer 30 tests for traditional line faults by performing independent electrical measurements on the tip and ring wires T, R of the selected line 12. First, the computer 30 performs such measurements to determine whether the selected line 12 has any metallic faults (step 52). Metallic faults include shorts to ground, to a voltage source, or between the paired wires T, R, and/or capacitive imbalances between the paired wires T, R of the selected line 12. Second, the computer 30 performs such measurements to determine whether the selected line 12 has any speed inhibiting faults (step 54). Speed inhibiting faults include resistive imbalances between the paired wires T, R of the selected line 12, and split pair or load inductances. Speed inhibiting faults also include bridged taps that reflect signals resonantly, e.g., the spurious tap 55 shown in FIG. 2, and elevated line-noise levels.

The threshold values of single-ended measurements, which indicate the above-described faults, generally depend on the type of data transmissions. Methods for performing and analyzing such single-ended measurements are known in the art. For example, U.S. Application No. 60/106,845 ('845), filed Nov. 3, 1993, by Roger Faulkner et al., and U.S. Pat. Nos. 5,699,402 ('402) and 4,113,998 ('998) describe such methods and apparatus. The '845 application and '402 and '998 patents are incorporated by reference, in their entirety, in the present application. The '402 application and the '402 and '998 patents also describe apparatus 53, of the measurement unit 27 used for the single-ended measurements to detect the faults.

If the computer 30 to finds either a metallic or a speed-inhibiting fault, the computer 30 disqualifies the selected line 12 for data transmissions (block 56). If the computer 30 finds no such faults, the computer 30 determines whether the selected line 12 attenuates signals of a selected frequency by more than a threshold value for the preselected data transmission service (step 58). In the absence of faults, the signal attenuation at high frequencies is the primary measure for determining a line's ability to transmit data.

Figure 4:
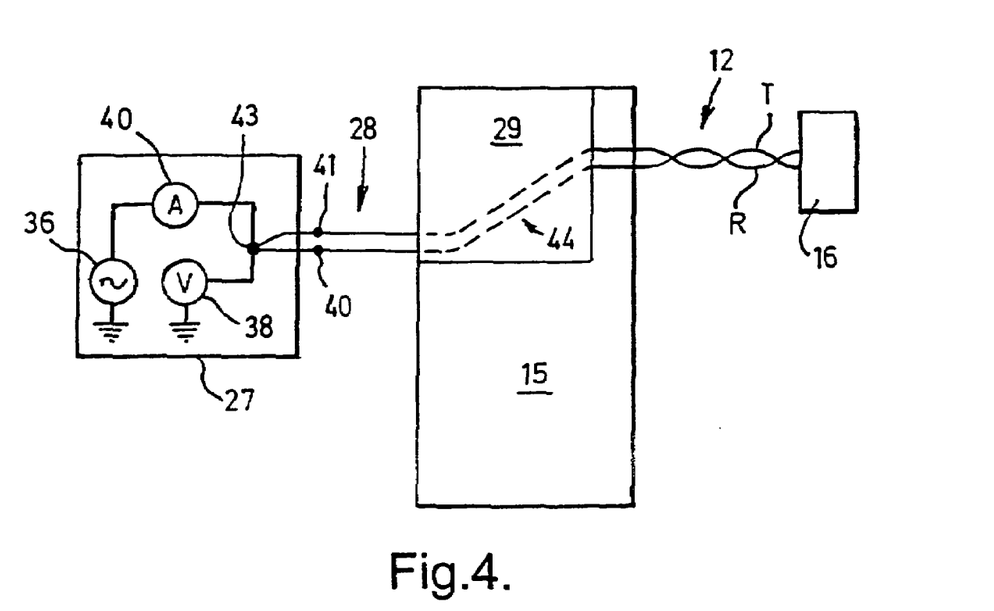
FIG. 4 shows a portion of the measurement unit that performs impedance measurements on the lines of FIG. 1.

FIG. 4 shows portions of the measurement unit 27 for measuring the impedances subsequently used to determine the attenuation of the selected customer line 12. The measurement unit 27 includes an AC signal generator 36, which provides an AC driving voltage and current for measuring the impedances. During the measurements, the AC signal generator 36 drives two input terminals 40, 41 in a common mode configuration. The input terminals 40, 41 electrically connect internally at a point 43 to produce the common mode configuration. The terminals 40, 41 also couple, via the line 28, to the test access 29 of the switch 15. The measurement unit 27 also has a voltmeter 38 to measure the driving voltage with respect to ground, and an ammeter 40 to measure the driving current in the common mode configuration.

The test access 29 has internal connections 44, which electrically couple the tip and ring wires T, R of the line 12 under test to the terminal 40 and the terminal 41, respectively. Thus, the tip and ring wires T, R are electrically connected together, at the switch end, so that the signal generator 36 drives these wires T, R in common mode configuration during impedance measurements. Driving the wires T, R in common mode makes electrical measurements insensitive to termination characteristics of the customer unit 16.

Both the preselected threshold value for the signal attenuation and the preselected frequency depend on the type of data transmission. For ISDN data transmissions, the preselected threshold is about 45 deci-Bells (dB) at 100 KHz. For ASDL data transmissions, the preselected threshold is about 40 dB at 300 KHz depending on deployed terminal equipment.

If the signal attenuation at the preselected frequency is above threshold, the computer 30 disqualifies the selected line 12 for the corresponding type of data transmissions (block 56). If the signal attenuation is below threshold at the preselected frequency, the computer 30 qualifies the line 12 for the corresponding type of data transmissions (block 60) providing no faults were found at either step 52 or step 54.

Figure 5:
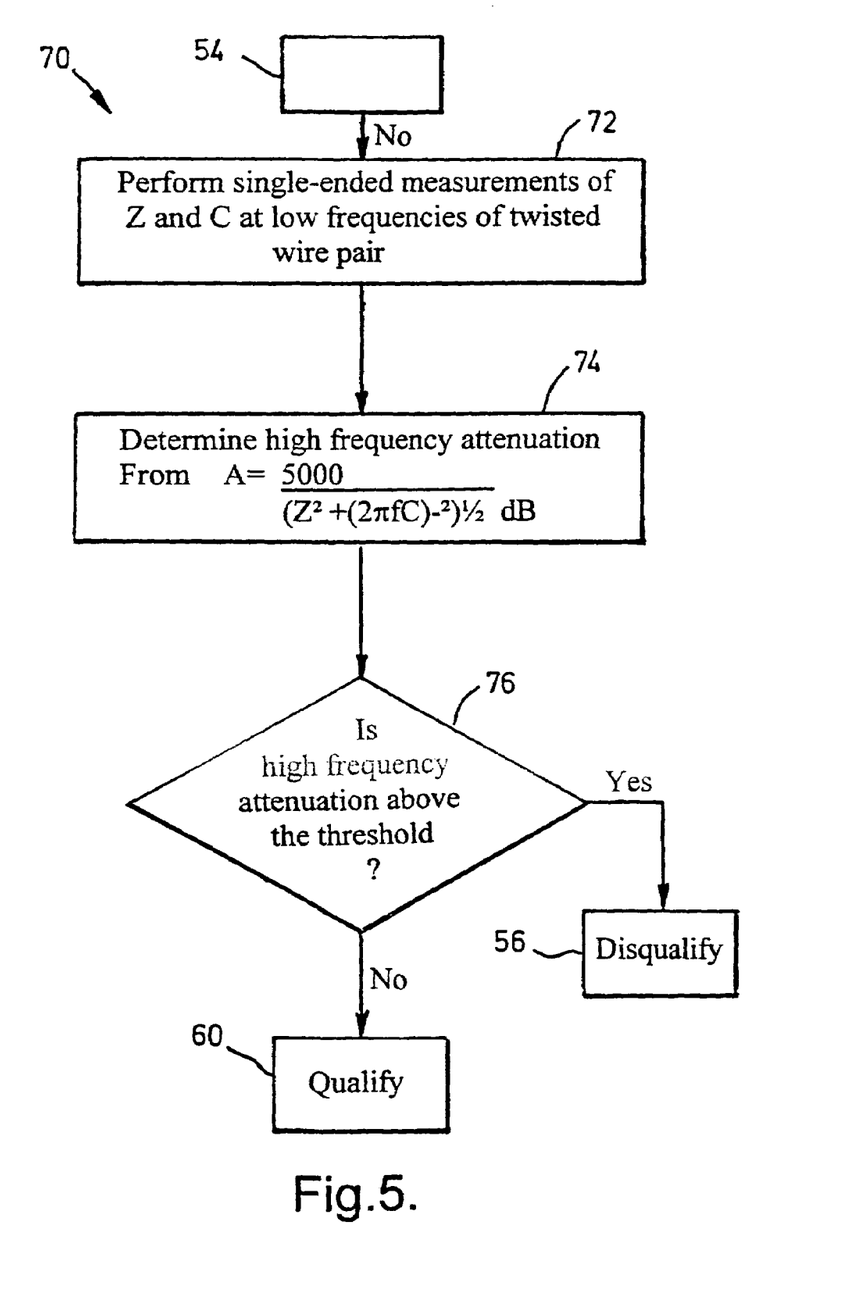
FIG. 5 is a flow chart for a method of qualifying customer lines using low frequency measurements on tip and ring wires driven in a common mode configuration with respect to ground.

FIG. 5 illustrates one method 70 of determining whether the signal attenuation for the selected line 12 is above the threshold in step 58 of FIG. 4. First, the measurement unit 27 performs single-ended common-mode measurements of the capacitance C and the impedance Z of the selected line 12 as described with relation to FIG. 3 (step 72). The measurements of C and Z are typically low frequency measurements, i.e., between about 300 Hz to 4 KHz, because the standard test access 29 of the switch 15 does not necessarily support high frequency measurements. If the test access 29 supports higher frequency measurements, such frequencies can be used to set a better resolution on the high frequency attenuation of the selected line 12.

The measurement unit 27 measures the capacitance C and then uses the value of C to determine the frequency for measuring the impedance Z. The capacitance C is a lumped value between the common mode tip and ring wires T, R and ground. The measurement unit 27 determines C at a low frequency, e.g., 80 Hertz (Hz). If the measured value of C is less than 400 nano-Farads (nF), the AC signal generator 27 drives the tip and ring wires T, R in common-mode at about 2.5 KHz to measure the impedance Z. If the value of C is greater than 400 nF, the AC signal generator 27 drives the tip and ring wires T, R, in common-mode, at a higher frequency between about 3 and 20 KHz, e.g., 3.0 KHz, to measure the impedance Z. The computer 30 uses the relation Z=V/I, where the voltage V is measured by the voltmeter 38 and the current I is measured by the ammeter 40, to find Z.

Next, the computer 30 determines the signal attenuation A(f) at high frequencies characteristic of data transmissions using the low frequency measurements of C and Z (step 74). The high frequencies are more than ten times the frequencies used for measuring Z and C. The value of "A(f)" at higher frequency "f" is known from an empirical formula (1) given by:

$$A(f)=K[Z^2+(2\pi fC)^{-2}]^{-1/2} \quad (1)$$

The value of K=5,000 dB-ohms provides good predictions of the attenuation A(f), in dB, for C and Z (in ohms) measured at low frequencies as described above. For this value of K, the frequency f, at which the attenuation is to be determined, should be between about 40 KHz and 300 KHz.

Next, the computer 30 determines whether the high frequency attenuation A(f) is above the preselected threshold for the selected type of data transmissions (step 76). If the attenuation A(f) is above the threshold, the computer 30 disqualifies the selected line 12. If the attenuation is below threshold, the computer 30 qualifies the selected line for the selected data transmissions.

Figure 6:
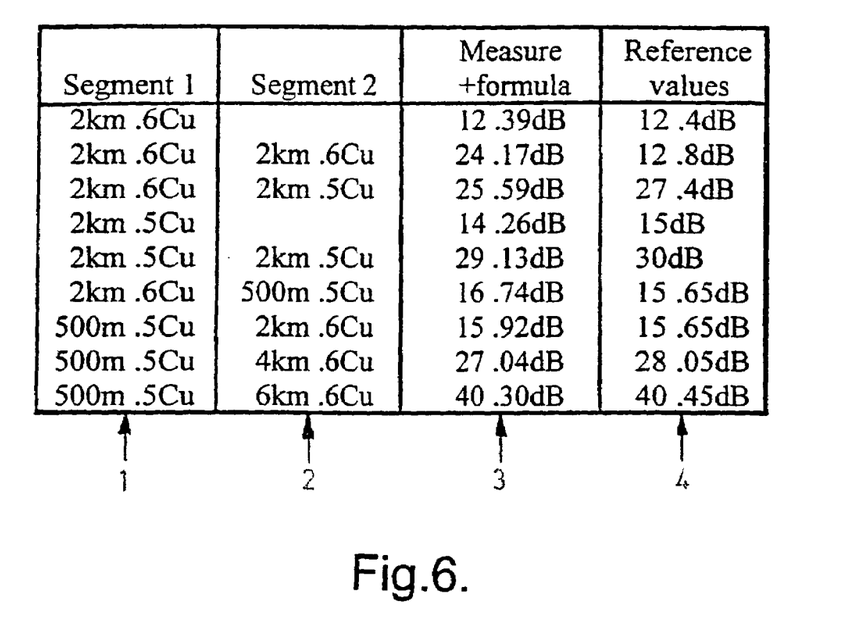
FIG. 6 is a table comparing attenuations found with the methods of FIG. 5 to reference values.

FIG. 6 shows a table 80 comparing values of the signal attenuation A, in dB, at high frequencies, found using the method 70, to reference values, found by an independent method, i.e., simulators. Column 3 of table 80 shows the values of A(f) predicted from low frequency measurements of C and Z and the formula (1). Column 4 of table 80 shows the values of A(f) obtained from simulators of customer lines, i.e., the reference values. The values of attenuation A(f) of FIG. 6 are given in dB's at a frequency "f" of about 100 K Hz.

The values of the high frequency attenuation A(f) of the table 80 correspond to a variety of one and two segment structures for the selected customer line 12. Columns 1 and 2 list segment lengths and gauges, i.e., diameters in millimeters, for the copper tip and ring wires T, R of the selected line 12. For each one and two segment structure shown, the predicted and reference attenuations differ by less than about 2 dB. Generally, formula (1) gives values of the high frequency attenuation A, which differ by less than about 3 dB for various segment mixtures if the wire gauges are between about 0.4 mm and 0.7 mm and total line lengths are less than about 6.5 km.

Figure 7:
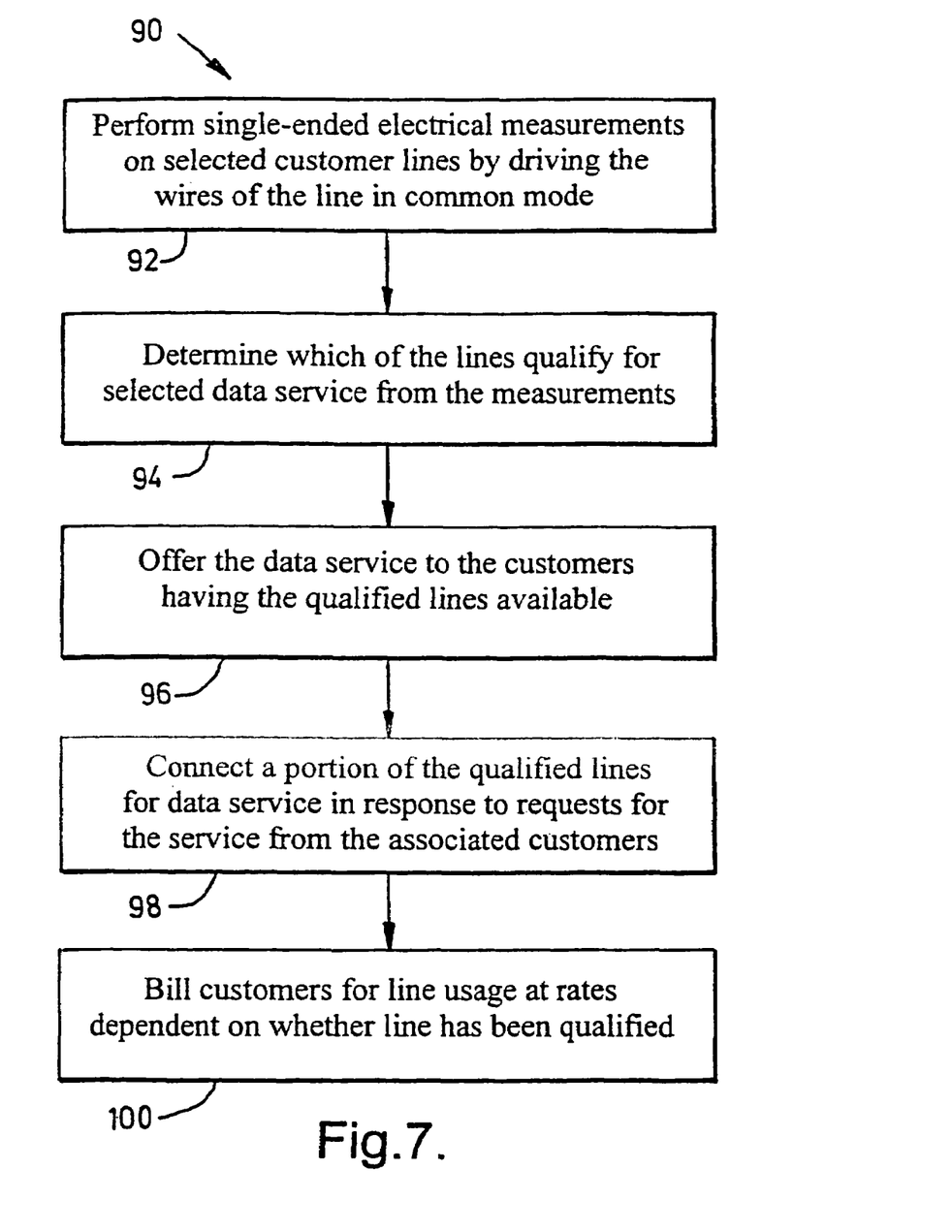
FIG. 7 is a flow chart illustrating a method of marketing data transmission services for customer lines.

FIG. 7 is a flow chart illustrating a method 90 of marketing preselected data transmission services for the customer lines 12-14 of FIG. 1. First, a TELCO performs common-mode single-ended electrical measurements on the selected group of lines 12-14 as described in relation to FIG. 3 and step 70 of FIG. 5 (step 92). Next, the TELCO determines which of the lines 12-14 qualify for the preselected data service from the measurements (step 94). This determination includes performing the steps 74 and 72 of the method 70 of FIG. 5 and may include the steps 52 and 54 of the method 50 of FIG. 4. The determination includes sorting the lines based on their final distribution points and qualification status for the preselected data transmission service. Next, the TELCO offers the preselected data transmission service to the portion of the customers to which the lines 12-14 qualified in step 94 are available, i.e., customers at final distribution points with qualified lines (step 96). The TELCO connects a portion of the qualified lines 12-14 to the customers who subsequently request the offered data services (step 98). The TELCO also bills usage for a portion of the lines 12-14 at prices that depend on whether the lines 12-14 qualify or disqualify for the data transmission services (step 100).

To provide the requested data services at step 98, the TELCO may swap customer lines to the same final distribution point. The swapping reassigns a qualified line to a customer requesting data service if the customer's own line is disqualified. The swap reassigns the customer's original disqualified line to another customer, who is at the same final distribution point and not demanding data service. The disqualified line can still provide voice services to the other customer. Thus, swapping can increase a TELCO's revenue by making more lines available for more expensive data services.

A TELCO can also use swapping in response to a request by the customer for data services. In response to such a request, the TELCO determines whether the customer's own line qualifies for the requested service by the above-described methods. If the line qualifies, the TELCO provides the customer data services over his own line. If the line disqualifies for the requested service, the TELCO performs additional qualification tests on other lines to the same final distribution point, which are not presently used for data transmission services. If one of those lines qualifies for the requested data service, the TELCO swaps the customer's line with the qualified line. Then, the qualified line provides data services to the customer requesting such services and the unqualified line provides normal voice service to the other customer.

Other embodiments are within the scope of the following claims.

What is claimed is:

1. A method of marketing customer telephone lines for a selected data transmission service, each line having associated tip and ring wires, comprising:
   automatically performing single-ended electrical measurements on a selected plurality of customer telephone lines while the associated tip and ring wires are connected together in a common mode configuration;
   determining which of the customer lines qualify for the selected data service from the measurements;
   sorting the lines based on final distribution points and qualification for the data service; and
   offering the selected data service to a portion of the customers in response to said portion having qualified lines available.

2. The method of claim 1, further comprising:
   billing customers for usage of the lines at rates depending on whether the lines qualified for the selected data transmission service.

3. The method of claim 1, wherein the act of determining includes finding a signal attenuation of the lines and qualifying lines having signal attenuations below a preselected threshold.

4. The method of claim 3, further comprising:
   monitoring a second portion of the customer lines after being placed in service by repeatedly performing one-ended common-modes electrical measurements on the second portion; and
   determining which of the lines of the second portion are qualified for the selected data transmission service from the repeated measurements.

5. The method of claim 1, further comprising:
   providing the data transmission service for a second portion of the lines qualified for the selected data transmission service in response to receiving requests from the associated customers for the service.

6. A method of marketing data transmission services to customers over telephone lines having associated tip and ring wires, comprising:
   performing single-ended electrical tests on a plurality of telephone lines connected to a final distribution point near where a customer is located, the tests driving tip and ring wires of the lines under test in a common mode configuration;
   determining whether the tested lines qualify for a selected data service; and
   offering the data service to the customer over one of the tested lines in response to the one of the tested lines being qualified.

7. The method of claim 6, further comprising: swapping the one of the tested lines with a line originally used by the customer in response to the line originally used by the customer being disqualified for the data service.

8. The method of claim 7, wherein the act of determining includes finding a signal attenuation of the tested lines and qualifying the tested lines having signal attenuations below a preselected threshold.

9. The method of claim 6, wherein the act of performing tests is responsive to receiving a request from the customer for the selected data service.

10. A method of marketing data transmission services to customers over telephone lines connected to a switch having a test access, comprising:
    connecting a measurement unit to the test access;
    using the measurement unit to make single-ended electrical measurements at a first frequency on a telephone line connected to the switch;
    determining whether the telephone line is qualified to provide a selected data service based at least in part on a prediction of attenuation at a second frequency, higher than the first frequency, made from the single-ended measurements; and
    providing the selected data service to a customer over the telephone line in response to determining that the telephone line is qualified.

11. The method of claim 10, wherein the act of using the measurement unit to make single ended electrical measurements comprises disconnecting the telephone line from a line card and rerouting it through the test access.

12. The method of claim 10, wherein the act of determining whether the telephone line is qualified is based at least in part on a prediction of whether the line contains a metallic fault.

13. The method of claim 12, wherein the act of determining whether the telephone line is qualified is based at least in part on a prediction of whether the line contains a speed inhibiting fault.

14. The method of claim 10, additionally comprising measuring the capacitance of the telephone line and selecting the first frequency based on the capacitance.

15. The method of claim 10, wherein the act of determining whether the telephone line is qualified comprises determining whether the predicted attenuation at the second frequency is above a threshold.

16. The method of claim 10, wherein the second frequency is between about 40 KHz and 300 KHz.

17. The method of claim 10 wherein the first frequency is between about 300Hz and 400 KHz.

18. The method of claim 10, wherein the first frequency is between about 300KHz and 20 KHz.

19. The method of claim 10, wherein the act of determining whether the telephone line is qualified is based at least in part on a prediction of attenuation computed from measured impedance and capacitance of the line at the first frequency.

20. The method of claim 9, wherein the computed attenuation is inversely. proportional to the square route of the sum of the impedance squared added to the reciprocal of the square of the product $2\pi$ times the second frequency and the measured capacitance at the first frequency.

* * * * *

UNITED STATES PATENT AND TRADEMARK OFFICE
CERTIFICATE OF CORRECTION

PATENT NO. : 7,436,935 B2  Page 1 of 1
APPLICATION NO. : 11/007970
DATED : October 14, 2008
INVENTOR(S) : Faulkner It is certified that error appears in the above-identified patent and that said Letters Patent is hereby corrected as shown below:

Column 2, Line 21, "freciuency" should read -- frequency --

Column 2, Line 24, "freciuency" should read -- frequency --

Column 2, Lines 24-25, "freciuency" should read -- frequency --

Column 8, Line 44, Claim 17, "about 300 Hz and 400 KHz" should read -- about 300 KHz and 4 KHz --

Column 8, Line 46, Claim 18, "about 300 KHz and 20 KHz" should read -- about 3 KHz and 20 KHz --

Signed and Sealed this

Seventeenth Day of March, 2009

JOHN DOLL
*Acting Director of the United States Patent and Trademark Office*